Nov. 3, 1936.  W. LANG  2,059,799
CARD VERIFIER
Filed July 19, 1933    4 Sheets-Sheet 1
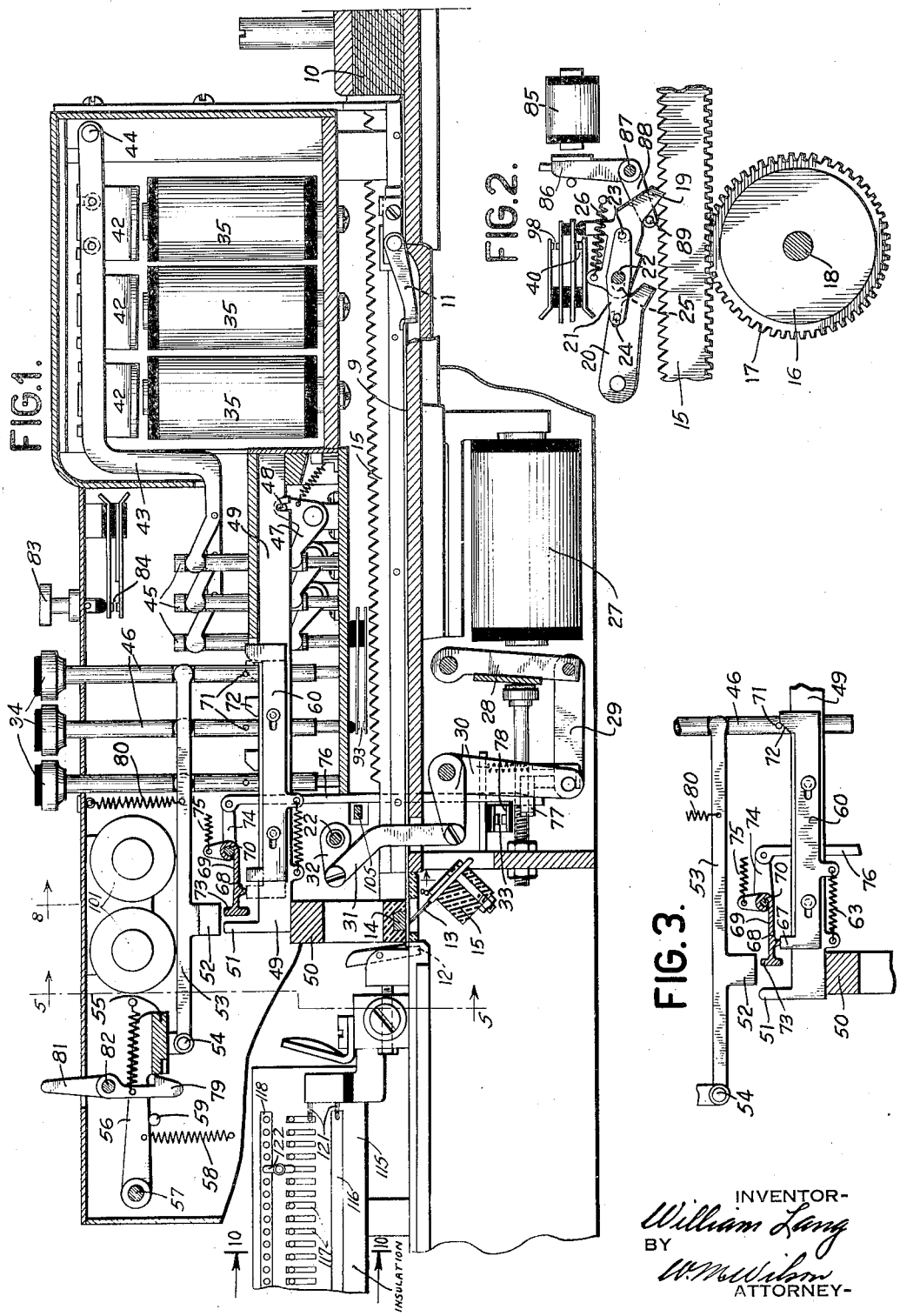
INVENTOR-
William Lang
BY
W. M. Wilson
ATTORNEY- Nov. 3, 1936. W. LANG 2,059,799
CARD VERIFIER
Filed July 19, 1933 4 Sheets-Sheet 2
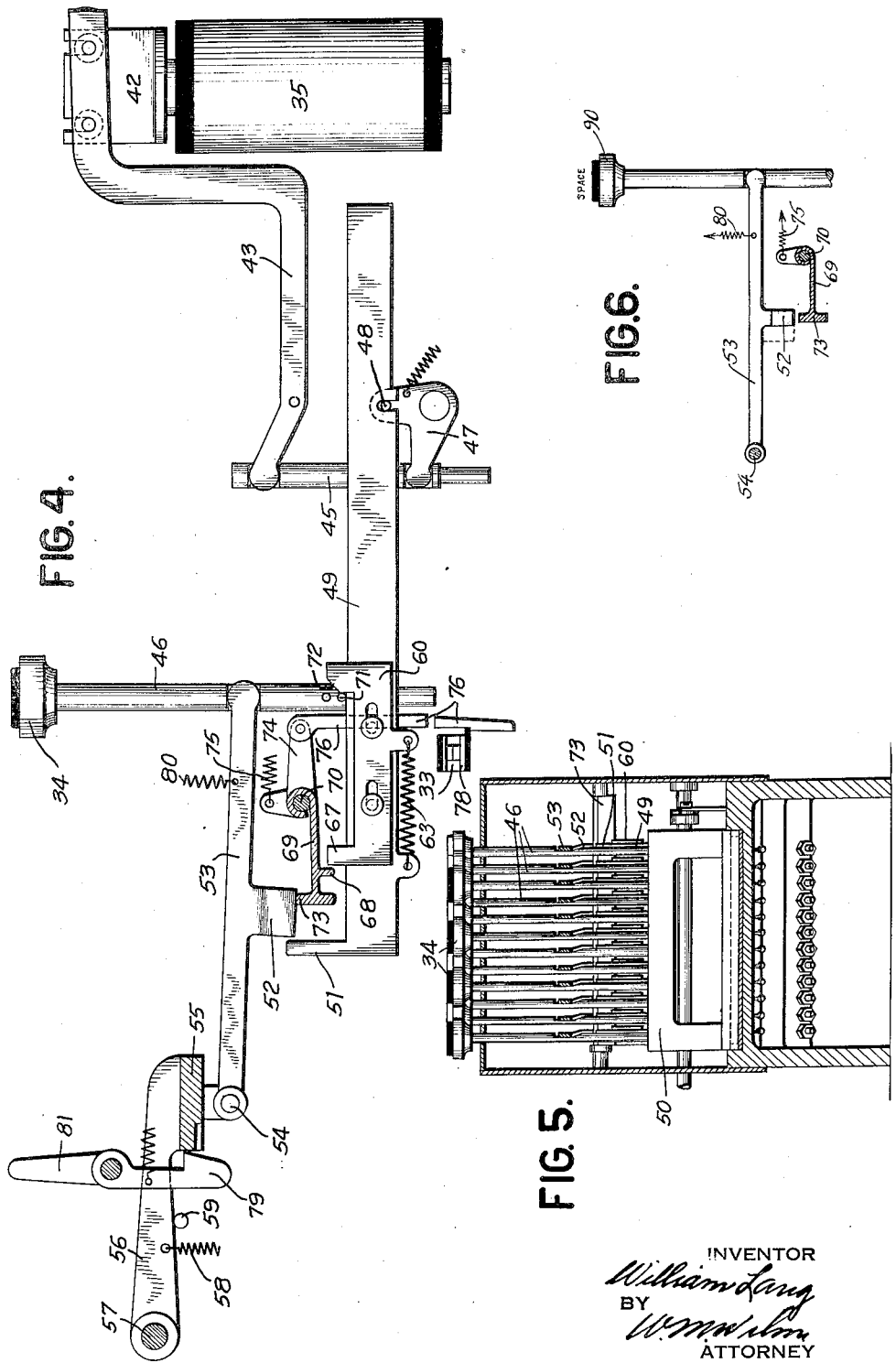
INVENTOR
William Lang
BY
ATTORNEY Nov. 3, 1936.  W. LANG  2,059,799
CARD VERIFIER
Filed July 19, 1933    4 Sheets-Sheet 3
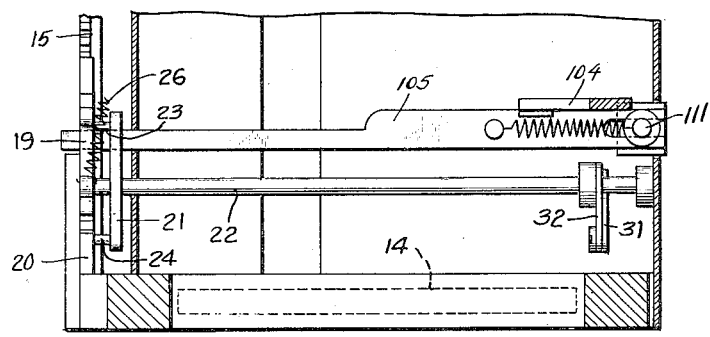
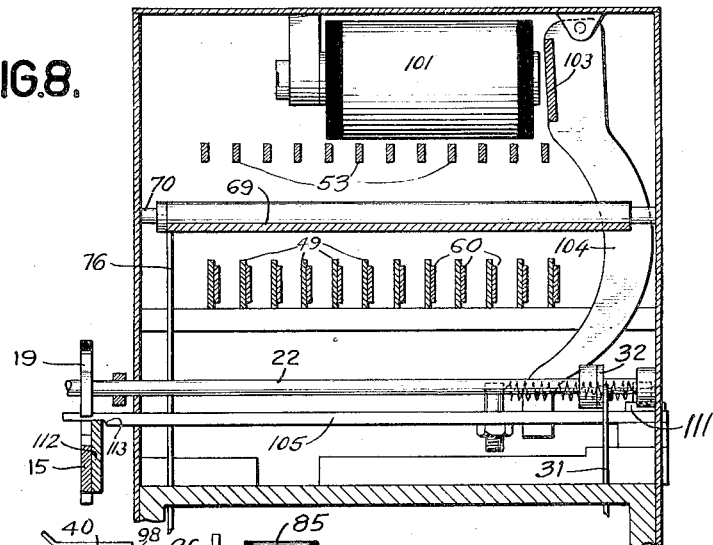
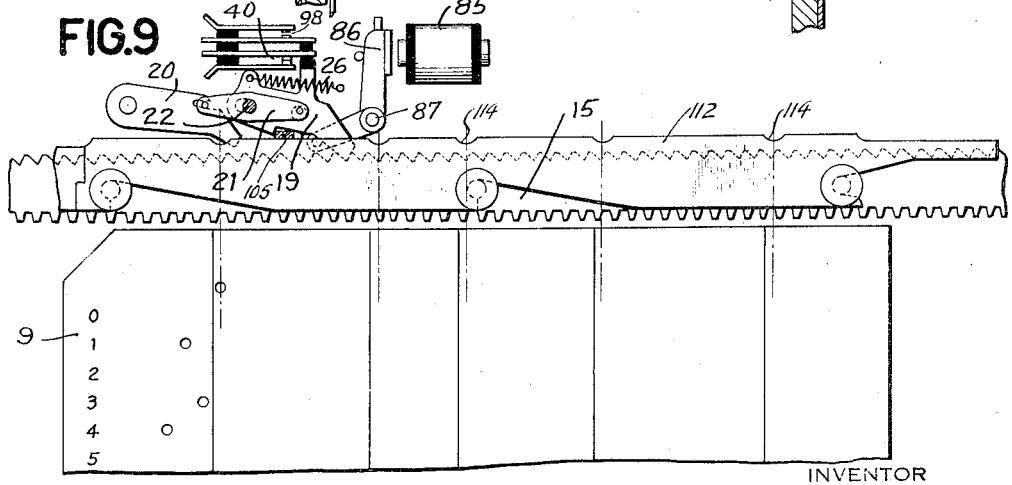
INVENTOR
William Lang
BY
W. M. Wilson
ATTORNEY Nov. 3, 1936.   W. LANG   2,059,799
CARD VERIFIER
Filed July 19, 1933   4 Sheets-Sheet 4
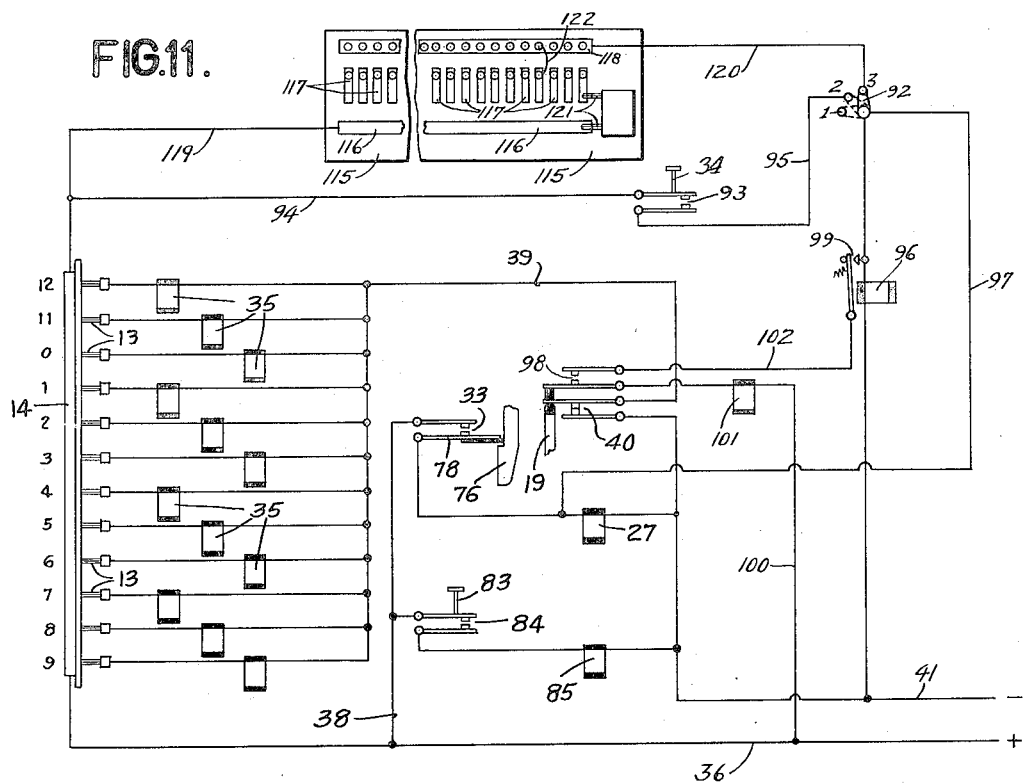
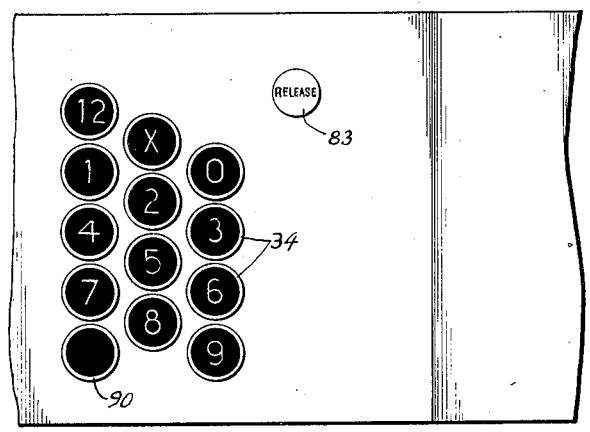
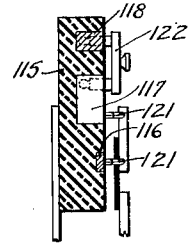
INVENTOR
William Lang
BY
W. M. Wilson
ATTORNEY Patented Nov. 3, 1936

2,059,799

UNITED STATES PATENT OFFICE 2,059,799

CARD VERIFIER

William Lang, New York, N. Y., assignor to International Business Machines Corporation, New York, N. Y., a corporation of New York Application July 19, 1933, Serial No. 681,071

7 Claims. (Cl. 73—51)

This invention relates to verifying machines and more particularly refers to machines for verifying perforated record cards.

In tabulating machine work, data are tabulated by feeding through the tabulating machine record cards having differentially spaced holes punched therein. Such record cards may be punched in any suitable punching machine preferably of the type disclosed in the patent to Schaaff No. 1,134,018 in which machine the punching operation is effected by depressing keys provided for that purpose. When using such punching machines operators sometimes depress the wrong key which results in incorrect data being punched in the card. It is, therefore, necessary to check the punched cards in order to determine if any errors have been made in the punching operation. Such checking frequently is accomplished by visual inspection of the cards, however, this method of checking the cards has been found to be unsatisfactory since the checker is liable to make the same error originally made by the operator who punched the card.

The instant invention, therefore, has for its main object the provision of a verifying machine into which punched cards may be placed and in which the correct punchings will be verified and all classes of errors in punching detected.

Various other objects and advantages of my invention will be obvious from the following particular description of one form of mechanism embodying the invention or from an inspection of the accompanying drawings and the invention also constitutes certain new and novel features of the construction and combination of parts hereinafter set forth and claimed.

In the drawings:

Fig. 1 is a sectional view taken through the card feeding and analyzing part of the machine.

Fig. 2 is a detail view of the spring drum for the carriage showing also the escapement mechanism.

Fig. 3 is a detail view showing the bar 49 and the slide 60 shifted by energization of one of the verifying magnets.

Fig. 4 is a detail view of one of the verifying keys and its associated control bar and magnet.

Fig. 5 is a sectional view taken on line 5—5 (Fig. 1) and looking in the direction indicated by the arrows.

Fig. 6 is a detail view of the space key.

Fig. 7 is a fragmentary view showing the skip lifter bar and the escapement pawls.

Fig. 8 is a sectional view taken on line 8—8 (Fig. 1).

Fig. 9 is a detail view showing the skip bar in relation to a typical card of the Hollerith type.

Fig. 10 is a sectional view taken on line 10—10 (Fig. 1).

Fig. 11 is a conventional circuit diagram of the electrical elements of the machine.

Fig. 12 is a top plan view illustrating the key board.

The verifying machine is provided with manipulative keys similar to those in the punching machine disclosed in the patent to Schaaff mentioned above. The checker operates the keys just as if a new card were being punched, and, if a card is correctly punched, the card carriage feeds forwardly one step upon depressing each key. If, however, a hole is punched in the wrong digital position in a column, the carriage does not feed forwardly thus warning the operator that an erroneous punching exists at that column.

In its preferred form the invention includes a set of independent sensing brushes adapted to make contact with a common contact bar through the perforations in the card thus establishing electric circuits through a series of magnets, one for each of the twelve index point positions on the card. These magnets, when energized, operate individual mechanisms which make it necessary to depress the corresponding key before the card carriage can escape to the next succeeding columnar position. If the hole sensed is in the wrong position, or, if the wrong key is depressed the escapement mechanism will not function, and the carriage will remain in the position at which the error was found.

Also when a card having combinational holes punched therein, that is, two or more holes punched in a column, is being verified it is necessary to concurrently depress the several keys corresponding to the several index point positions of the combination being checked.

Card carriage

Referring to Figure 1 of the accompanying drawings the cards 9 are fed from a stack 10 between a pusher 11 and a forward guide 12 to bring the first column of the card in alinement with a series of sensing brushes 13. These brushes are adapted to make contact through the perforated holes in the card with a common bar 14 (see also Fig. 11). The brushes 13 are securely mounted in a dielectric bar 15 suitably supported in the machine.

The card pusher 11 and the guide 12 are secured to a carriage rack 15 which is supported and guided in a well known manner in its reciprocatory travel by rollers (not shown) cooperating with a rail structure integral with the frame of the machine. The card carriage, including the rack 15, is urged toward the left (Fig. 1) and a suitable escapement mechanism including pawls 19 and 20 (Fig. 2) cooperates with the serrated upper edge of the rack 15 to permit step by step movement thereof.

As viewed in Figure 2, the pawls 19 and 20 are in their normal positions wherein the pawl 19 is in engagement with the rack 15, holding the card carriage in analyzing position against the action of the spring drive which includes a spring (not shown) enclosed in a spring drum 16 (Fig. 2) attached to the side of a gear 17 mounted on a shaft 18. The gear 17 meshes with teeth on the lower edge of the rack 15. This spring drive constantly urges the carriage toward the left (as viewed in Figs. 1 and 2).

A lever 21 secured on the end of a shaft 22 carries in one arm a pin 23 projecting into an enlarged opening in the pawl 19. A pin 24 in the other arm of the lever 21 is embraced by an open slot in the pawl 20. As the shaft 22 and lever 21 rock counterclockwise (Fig. 2) the pin 24 lowers the pawl 20 into engagement with the rack 15 and, at the same time, the pin 23 raises the pawl 19 out of engagement with the rack. The pawl 19 is provided with a slightly elongated slot 25 surrounding the shaft 22 so that, as the pin 23 raises said pawl out of engagement with the rack, a spring 26 advances the pawl slightly. Upon clockwise movement (Fig. 2) of the arm 21, the pawl 19 is lowered into engagement with the next succeeding notch in the rack 15 thus effecting a single step of movement of the card carriage to bring the next succeeding column into registry with the sensing brushes 13.

The escapement mechanism, just described, is rocked by an escapement magnet 27 (Figs. 1 and 11). The armature 28 of this magnet is connected by a link 29 to one arm of a bell crank 30, and a link 31 connects the other arm of the bell crank to an arm 32 on the shaft 22.

When the magnet 27 is energized it attracts its armature 28 rocking the bell crank 30, the arm 32 and shaft 22 counterclockwise (Fig. 1) to effect an escapement of a single step, as set forth above, to permit a single step of movement of the card carriage.

The escapement magnet 27 is energized by the closing of a pair of contacts 33 under the joint control of the analyzing brushes 13 and the keys 34. Referring to Figure 11 it may be noted that a magnet 35 is wired in series with each of the brushes 13. When a column having one or more perforate index points therein comes into alinement with the brushes 13, the brush for the perforate index points makes contact through the perforations with the bar 14 thus establishing a circuit from one side 36 of a supply line to the common bar 14, through the hole in the card, brush 13, magnet 35, wire 39 and contacts 40 to the other side 41 of the supply line.

This energizes the magnet 35 whose brush 13 has made contact with the bar 14 through a punched hole in the card. The energized magnet 35 attracts its armature 42 (Figs. 1 and 4) which armature is carried by an arm 43 pivoted at 44 and having its opposite end rounded and embraced by a horizontal slot in a plunger 45 which is not unlike the stems 46 for the keys 34. Thus when the magnet 35 is energized, attracting its armature 42, it rocks the arm 43 counterclockwise thrusting downwardly the particular plunger 45 associated therewith. Near its lower end the plunger 45 has a slot embracing one arm of a bell-crank 47 the other arm of which carries a pin 48 projecting into a slot formed in the lower edge of a horizontally disposed bar 49.

When the plunger 45 is thrust downwardly it rocks the bell-crank 47 counterclockwise thrusting the bar 49 toward the left, as viewed in Figure 1 to the position in which it appears in Figure 3. The left hand end of the bar 49 (Figs. 1 and 4) slides on a cross frame 50 and the bar 49 at this end has a projection 51 normally resting beneath a broad lug 52 on a lever 53 pivotally supported at 54 on a bail 55 whose arms 56 are pivoted on a rod 57. The right hand end of the lever 53 is rounded and is embraced by a slot in the key stem 46 for the associated key 34. A spring 58 urges the bail 55 clockwise (Figs. 1 and 4) against a stop stud 59.

A slide 60, mounted on headed studs projecting from the bar 49, is adapted to slide longitudinally on the bar but is normally held in its left hand position with respect to the bar 49 (Figure 1) by a spring 63 having an end secured to the slide 60 and the other end fast on bar 49.

As the bar 49 is shifted toward the left, through the agency of the magnet 35, a projection 67 on the slide 60 is brought beneath a rib 68 on a universal bar 69 pivoted on a shaft 70. The bar 69 also has a rib 73 extending beneath all of the lugs 52. At the same time the leftward movement of the bar 49 brings the projection 67 beneath the rib 68; it also carries the projection 51 from beneath the lug 52. The parts are shown in the above described position in Figure 3.

The operator reading the data from the record from which it was originally punched on the card being analyzed, now depresses the key or keys 34 corresponding to the data to be verified. As the key is depressed a pin 71 projecting from the key stem 46 cooperates with a beveled projection 72 on the slide 60 and cams this slide toward the right removing the projection 67 from beneath the rib 68. Continued depression of the key brings the lug 52 into contact with the angular end 73 of the universal bar 69 and rocks this bar, together with the shaft 70 and an arm 74 secured to said shaft, counterclockwise against the tension of a spring 75. This movement of the arm 74 raises a link 76, pivotally connected thereto and having a hook at its lower end cooperating with the lower blade 78 for the contacts 33, thus closing these contacts to energize the escapement magnet 27. This magnet, as set forth above, acts to rock the shaft 22 (Fig. 2) thus operating the pawls 19 and 20 to permit the card carriage to travel one step toward the left (Fig. 1) to bring the next succeeding column into registry with the sensing brushes 13.

As the energized escapement magnet 27 attracts its armature 28 drawing the link 29 (Fig. 1) toward the right, a projection 77 extending upwardly from the left hand end of the link 29, rocks the link 76 counterclockwise about its pivot on the arm 74, disengaging the hook at the lower end of the link 76 from the switch blade 78 carrying the lower contact 33. The inherent spring tension of these blades opens the contacts 33 which deenergizes the escapement magnet 27. The blade 78 now rests to the left of the link 76 below the hook so that it is necessary to release the depressed key 34 allowing the lever 53 to return to initial position permitting the spring 75 to rock the universal bar clockwise to normal.

This lowers the link 76 and the hook again assumes its position below and in cooperative relation with the blade 78 in readiness for the subsequent depression of one or more of the keys 34.

From the above description it can be seen that, if a hole is present in for instance, the "five" position on the card and the "five" key 34 is depressed, the escapement magnet 27 is energized and the carriage spaced one step. However, two general conditions may obtain wherein the escapement magnet would not be energized. These conditions are: (1) A hole is sensed in the correct position and the wrong key is depressed, and (2) a hole is erroneously placed and the correct key is depressed. Under these conditions the machine functions as follows:

Assuming that the hole is properly placed in the "five" position but the wrong key is depressed, as soon as the brush 13 senses the hole the circuit is completed through the corresponding magnet. This magnet, being energized, shifts the bar 49 associated therewith toward the left, removing the projection 51 from beneath the lug 52. At the same time the slide 60 is carried leftward with the bar 49 to bring the projection 67 under the rib 68. The operator now depresses the "six" key instead of the "five" key. In this case the slide 60 on the bar associated with the "five" digital order will not be drawn to the right consequently the projection 67 remains under the rib 68 of the universal bar 69 thus preventing counterclockwise movement of this bar to close the contacts 33, and the escapement magnet remains unenergized.

When the operator depresses the "six" key under this condition the lug 52 comes into contact with the projection 51 on the bar 49 associated with this key, and, continued depression of the key rocks the lever 53 clockwise about the point of contact of the lug 52 and the projection 51 as a pivot. This raises the left hand end of the lever 53 and rocks the bail 55 counterclockwise about its shaft 57. As the bail 55 swings upwardly it is latched in its raised position by a spring-pressed hook 79 (Figs. 1 and 4).

When the bail 55 is latched in its raised position and the depressed "six" key 34 is released by the operator a spring 80 rocks the lever 53 counterclockwise about its pivot 54 raising the key to its normal position. The left hand ends of all of the levers (there is a key 34 and a lever 53 for each digital position on the card) are supported on the bail 55, consequently when the bail 55 is raised, as just described, it raises all of the lugs 52 far enough so that if another key 34 is depressed before the latch 79 is operated to release the bail 55, the link 53 will not be rocked far enough to come into contact with either the projection 51 on the bar 49 or the projection 73 on the universal bar 69. This does not effect an escapement of the carriage but does act as a warning to the operator that an error exists on the card then in the machine or that the operator has depressed the wrong key. The operator may recheck the particular column by first rocking a lever 81 secured to the shaft 82 upon which is fast the latch 79, to free the bail 55 to its spring 58, which spring immediately restores the bail to its normal position. Reading the data again from the original record the operator depresses the proper key 34.

If the key now depressed corresponds to the data punched in the column being analyzed the slide 60 is drawn toward the right (Fig. 4) and the universal bar 69 operated to energize the escapement magnet, as set forth above, and the operator may proceed with the verification of the next column. However if the bail 55 is again raised and latched the operator is assured that the error exists on the card. The operator then removes the card from the machine in the following described manner:

By depressing a release key 83 (Figs. 1 and 11) contacts 84 are closed energizing a magnet 85 (Figs. 2 and 11). The armature 86 of this magnet is secured to a shaft 87 to which is also secured an arm 88 carrying a stud 89 projecting beneath the escapement pawl 19. Energization of the magnet 85 attracts its armature 86 rocking the shaft 87 and arm 88 clockwise to disengage the pawl 19 from the rack 15 whereupon the spring drive shifts the carriage in one movement to its extreme left hand position where the card may be removed and another placed in the carriage.

All disagreements between the holes punched in a particular column and the keys depressed affect the machine in substantially the same manner, for instance, should the hole punched in the card be in the wrong position and the operator depress the correct key the several parts will function exactly as described to render the escapement ineffective.

If an additional hole is punched in a column which should have a single hole therein, the magnet 35 corresponding to the extra hole will cause the slide 60 to be carried toward the left positioning the projection 67 under the rib 68 thus preventing energization of the escapement magnet. Likewise if a column should have two holes punched there and one of said holes is missing, the magnet 35 corresponding to the missing hole will not be energized and will not shift the projection 51 from beneath the lug 52, consequently depression of the corresponding key will prevent energization of the escapement magnet 27.

In this manner the depression of any key or keys which do not correspond to the hole or holes in the card will prevent escapement of the card carriage thus warning the operator of the error.

*Column and field skipping*

Should there be one or more columns on the card in which there is no perforate point and in which column none is intended, the escapement is effected by operation of a space key 90 (Figs. 6 and 12). This key is just like the keys 34 and upon depression, operates a lever 53 to rock the universal bar 69, shaft 70 and arms 74 counterclockwise to close contacts 33 which energizes the magnet 27 to effect an escapement of the carriage one step to the next column.

Tabulating cards of the well known Hollerith type are usually divided into a plurality of fields, each field comprising a plurality of columns. The number of columns included in a field depends on the requirement for that particular field. It sometimes happens that a certain field or fields remain entirely unpunched in which case, in order to maintain and to increase the speed at which these machines are operated a device is provided to skip either parts of or entire fields either automatically or under the control of the "X" key 34. This is the key 34 which corresponds to the "11" or, as it is generally called, "X" index point position of the card.

Skipping a field under the control of the "X" key 34 is useful when it is desired to verify, through the medium of a hole punched in the "11" or "X" position in the first column of the field to be skipped, that the field is blank.

The automatic feature of skipping a field or fields may be used to skip a blank field without verifying or to skip a field previously gang-punched and which it is not necessary to verify.

The operation of the skip mechanism under the control of the "X" key 34 will be described first. In order to operate the skip mechanism under control of this key a switch 92 (Fig. 11) is set at the contact marked "2". Depression of the "X" key 34 closes contacts 93 (located directly beneath the stem 46 of this key, see Fig. 1) setting up a circuit from line 36, bar 14, wire 94, contacts 93, wire 95, switch 92, a relay magnet 96 to line 41. Another circuit is completed at the same time from the switch 92 by a wire 97 through the escapement magnet 27. This energizes magnet 27 and effects an escapement of the carriage in the usual manner by rocking the pawl 19 counterclockwise (Fig. 2) which movement closes contacts 98. Upon energization of the magnet 96 contacts 99 are closed so that when the contacts 98 close a holding circuit is set up from line 36, wire 100, a magnet 101, contacts 98, wire 102, contacts 99, magnet 96 to the line 41.

Energization of the magnet 101 attracts its armature 103 rocking an arm 104 clockwise (Fig. 8) to slide a skip lifter bar 105 toward the left as viewed in Figures 7 and 8. At its right hand end (Figs. 7 and 8) the bar 105 is guided by a stud 111 and the reduced left hand end of said bar rests on the upper edge of a skip bar 112 removably mounted on the carriage slide 15. At the leftward movement of the bar 105 a beveled shoulder 113 coacts with the skip bar 112 to raise the end of the bar 105. At this time the bar 105 is resting in one of a plurality of recesses 114 in the upper edge of the bar 112. It will be noted by reference to Fig. 9 that the recesses 114 are in position corresponding to the first column in each card field. The bar 105 is thrust leftward first after the pawl 19 is raised and the escapement occurs when the shaft 22 is rocked clockwise (Fig. 9) to raise the pawl 20 out of engagement with the rack 15. As the carriage shifts toward the left the recess 114 passes from beneath the bar 105 camming this bar, which is now in its left hand position (Fig. 8), upwardly to retain the pawl 19 in its raised position. Thus both the pawls 19 and 20 are held out of engagement with the rack 15 and the carriage is free to travel towards the left until such time as the next recess 114 comes under the bar 105 when said bar drops into the recess permitting the pawl 19 to reengage the rack 15 stopping the carriage in a position corresponding with the first column of the next field.

The clockwise movement of the pawl 19 to reengage the rack 15 opens the contacts 98 which deenergizes the magnet 101 whereupon the bar 105 is retracted by its spring 106. If no "X" hole is present when the "X" key 34 is depressed, the corresponding arm 53 will be rocked to raise bail 55 and permit rocking of arm 81, thus indicating that there is an error and preventing effective operation of the other keys 34.

The same procedure is followed if it is desired to verify the "X" punch in the next, or any other field.

When it is desired to skip a field previously gang-punched or in which there are no punchings, an automatic device, now to be described, is brought into use. This device includes a dielectric bar 115 (Figs. 1, 10, and 11) mounted on the frame of the machine. Secured on the bar 115 are a common conductor 116, a series of contacts 117 (one for each card column), and a plug bar 118. The bar 116 is connected by a wire 119 and the bar 14 (Fig. 11) to the line 36. The bar 118 is connected by a wire 120 to the contact 3 of the switch 92. Bridging brushes 121 suitably mounted on the carriage are adapted to close a circuit from the common bar 116 successively with the contacts 117 as the carriage escapes from column to column. A plug 122 may be used to connect any one of the contacts 117 to the bar 118.

If it is desired to skip an entire field the plug 122 may be placed in position to connect the contact 117, corresponding to the first columnar position in the field to the bar 118. However, if it is not desired to skip the entire field, the plug 122 is inserted in the particular columnar position at which it is desired to start the skipping action.

With the plug 122 in the proper position and the switch 92 on the contact 3, the operation of the skip mechanism is as follows:

The operator proceeds with the column by column vertification under the control of the verifying keys 34 in the manner previously described. When the last column preceding the field to be skipped is verified the carriage escapes to the first column in the field to be skipped. At this time the brushes 121 complete a circuit from the line 36 to bar 14, wire 119, bar 116, brushes 121, contact 117, plug 122, bar 118, wire 120, switch 92, magnet 96 to line 41. Also from switch 92 a circuit is completed through magnet 27 to line 41.

Energization of the magnet 27 effects an escapement in the usual manner operating the escapement pawl 19 which closes the contacts 98 completing a circuit from the line 36, wire 100, magnet 101, contacts 98, wire 102, contacts 99 closed upon energization of magnet 96, magnet 96 to line 41. This forms a holding circuit through the magnet 96 and energizes magnet 101 which shifts the skip lifter bar 105 toward the left to maintain the pawl 19 in raised position until the next recess 114 arrives thereunder. This permits the bar 105 to drop lowering the pawl 19 into engagement with the rack 15 thus stopping the carriage with the first column of the next succeeding field above the brushes 13. The operator may then proceed to verify this field, or the field may be skipped.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is:

1. In a machine of the class described, the combination of a perforate record card carriage, escapement means therefor, a series of keys, sensing means for the record card, means controlled by said keys to effect a column by column escapement of the carriage, means normally effective to prevent an effective operation of the escapement effecting means by said keys, means controlled by said sensing means to render the preventing means ineffective, and to cause other preventing means to become effective to prevent operation of the escapement effecting means as the first mentioned preventing means is rendered ineffective, and means to render the second preventing means ineffective.

2. In a machine of the class described, the combination of a carriage for perforated cards, escapement means therefor, a series of keys, sensing means for the cards, means controlled by said keys to effect a step by step escapement of the carriage, means normally effective to prevent effective operation of the escapement effecting means, a second preventing means, means controlled by said sensing means simultaneously to shift the normally effective preventing means to ineffective position and to shift the second preventing means to effective position, and key operated means to return the second preventing means to ineffective position.

3. In a machine of the class described, the combination of a carriage for perforated cards, a key for each digital position on the card, sensing means for each digital position on the cards, escapement means to effect a step by step escapement of the carriage, means common to all of the keys to effect an operation of said escapement means upon depression of a key, individual means associated with each digital position to normally prevent operation of the escapement effecting means, means operated by said sensing means under control of a perforate digital point to shift the corresponding preventing means to ineffective position, a second preventing means carried by the first preventing means and adapted to be shifted to effective position as the first preventing means is shifted to ineffective position, and means operated by the corresponding digital key to shift the second preventing means to ineffective position whereby said common escapement effecting means may be operated by said key.

4. In a machine of the class described, the combination of a carriage for perforated cards, a sensing station, means to effect a step-by-step escapement of the carriage to present and remove a card column to said station, a series of keys, means including a single pair of contacts and a controlling member common to all of said keys to initiate an escapement of the carriage to remove said column, separate means associated with each key and adapted to be actuated upon depression of said key to operate the initiating means to remove said column, means controlled by said sensing station to prevent said removing operation of the key actuated means, and means to render all of the key actuated means ineffective to remove the column upon depression of any one of the keys.

5. In a machine of the class described, the combination of a carriage for perforated cards, an escapement device for the carriage, a magnet to control the escapement device, a series of keys one for each index position on the card, a pivoted bar common to all of the keys, said bar being adapted when rocked to cause energization of the magnet, a series of levers one for each key to rock the bar upon depression of a key, slides normally preventing effective operation of the levers, magnetic means controlled by the perforate index points on the card to shift the slides to ineffective positions, other slides mounted on the first mentioned slides and adapted to be shifted therewith to prevent operation of the bar, and means operated by depression of a key to withdraw the corresponding second mentioned slide to ineffective position to permit operation of the bar to effect an escapement of the carriage.

6. In a machine of the class described, the combination of a carriage for perforated cards, an escapement device, a series of keys, a pivoted bar operated by depression of a key to initiate an escapement, individual levers actuated by depression of the keys to operate the pivoted bar, slides normally effective to prevent effective operation of the levers, said slides being adapted to be shifted to ineffective position under control of perforate index positions on the card, and other slides to render all of the levers ineffective upon non-coincidence of the depressed key and a perforate index position.

7. In a comparing device for record card verifying machines, a plurality of testing keys, one for each index point position of a card column, a plurality of sensing devices, one for each index point position of a card column, a plurality of similar members, each corresponding to a key and to a related sensing device, said members being normally arranged in alinement with one another, electro-magnetic means controlled by said devices upon sensing perforations in a record card column for moving the corresponding members out of normal alinement, means controlled by the keys for returning said moved members into alinement and means for indicating the failure of any of said members to return to alinement upon operation of said keys.

WILLIAM LANG.